Aug. 22, 1961 W. BUCHHOLZ ET AL 2,997,696

MAGNETIC CORE DEVICE

Original Filed July 14, 1954 2 Sheets-Sheet 1

INVENTORS
WERNER BUCHHOLZ
MUNRO K. HAYNES
GORDON E. WHITNEY

BY William J. Schelberg
AGENT

INVENTORS
WERNER BUCHHOLZ
MUNRO K. HAYNES
GORDON E. WHITNEY

BY William V. Schelberg
AGENT

United States Patent Office 2,997,696
Patented Aug. 22, 1961

2,997,696
MAGNETIC CORE DEVICE

Werner Buchholz and Munro K. Haynes, Poughkeepsie, N.Y., and Gordon E. Whitney, Princeton, N.J., assignors to International Business Machines Corporation, New York, N.Y., a corporation of New York Original application July 14, 1954, Ser. No. 443,234, now Patent No. 2,931,014, dated Mar. 29, 1960. Divided and this application Oct. 24, 1957, Ser. No. 692,186
5 Claims. (Cl. 340—174)

This invention relates to magnetic core pulse producing circuits as described herein in connection with apparatus for converting data in one form and available at one rate to another form for delivery at another rate as set forth in copending application Serial Number 443,234, filed July 14, 1954, and now issued as Patent No. 2,931,014, to which this application relates as a divisional application.

Apparatus of the type described in the aforementioned application is of particular utility in connection with input-output devices for electronic digital computers as a transfer medium between systems of different pulse input and output speeds. Information sensed in parallel form is stored in an array of magnetic cores at the frequency of operation of a card sensing machine, for example, and this information is then read out of the array in serial form at the rate demanded by a utilization device. Conversely, a utilization device, after performing arithmetic or other operations on information from one or more information input sources, or merely temporary storage thereof, may deliver selected resultant information in serial form for entry in a permanent record. Apparatus for performing this recording operation may be adapted to accept signals representing information in parallel form and at a still different rate so that a buffer storage and converter device of the type described may also be used as an intermediate component to couple the output and input of this apparatus to provide correct timing as well as a conversion of the form of the data.

In accordance with this invention a magnetic core pulse producing device is providing whereby operating pulses are produced in timed sequence for controlling the rate and sequence of operation of the array of magnetic cores in receiving and delivering information pulses.

Accordingly, an object of the invention is to provide an improved ring circuit employing magnetic cores and adapted to provide sufficient power for operation of an array of magnetic devices.

Other objects of the invention will be pointed out in the following description and claims and illustrated in the accompanying drawings, which disclose, by way of example, the principle of the invention and the best mode which has been contemplated of applying that principle.

As previously mentioned, signals representing information may be available in parallel form when the device to which they are directed requires serial information and, conversely, the information may be available in serial form with the utilization device requiring parallel information and in each instance at a different rate of pulse delivery. It is to be understood that the source of information as well as the utilization device may be any conventional medium such as a punched card or tape, a magnetic tape or drum, electronic or electromechanical apparatus such as a register, computer, or any device of a like nature. In explanation of the invention specific means are first described in connection with a buffer converter for receiving information in a parallel sense and for converting it to serial delivery at a ratê dissimilar to that of the source means. Conversion from serial to parallel form is accomplished in a similar manner as will be described hereafter.

Figure 1:
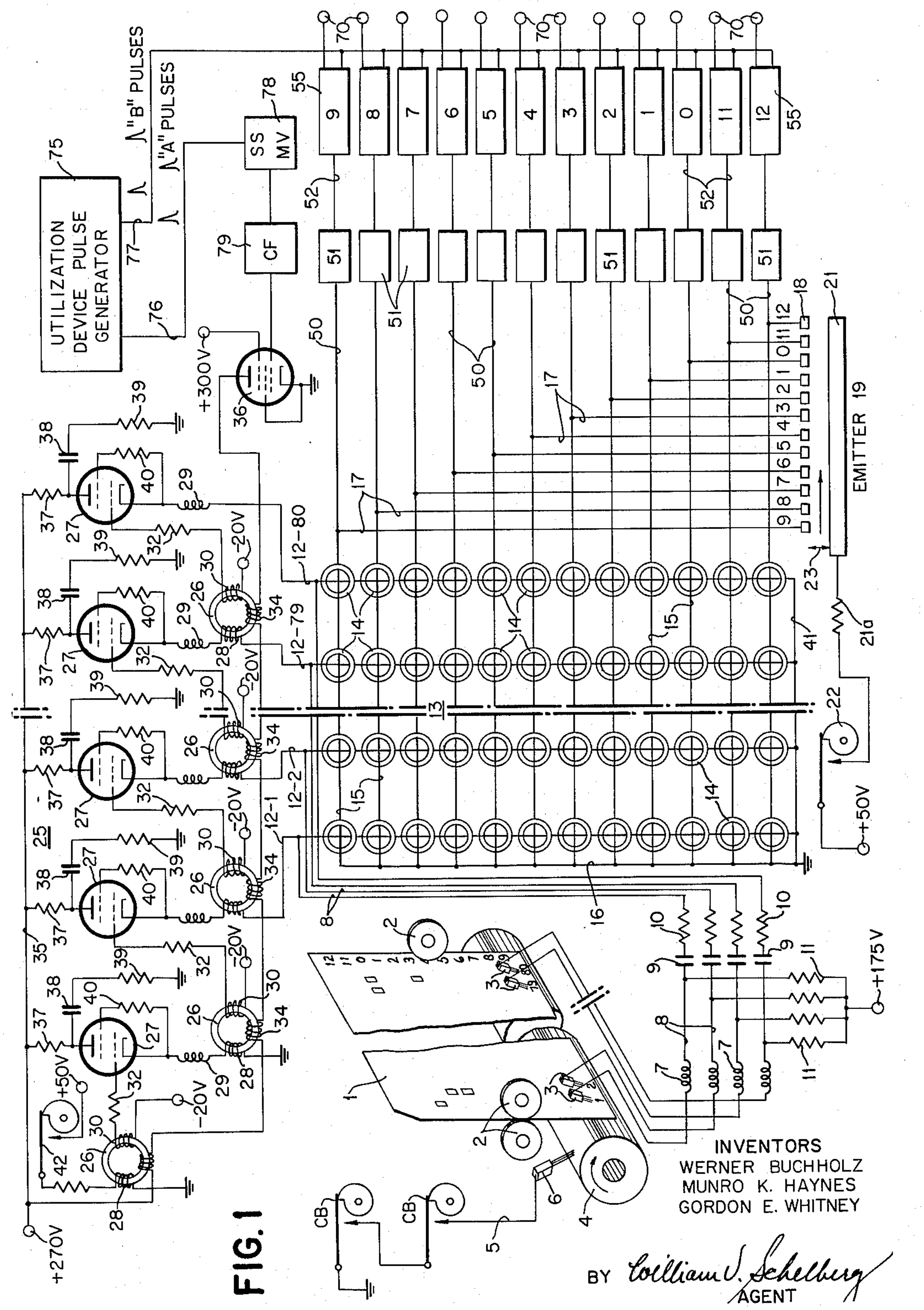
FIGURE 1 is a schematic circuit diagram illustrating use of the system in performing information conversion from parallel to serial form with dissimilar input and output information delivery rate.

Referring now to FIGURE 1 of the drawing, record cards 1 of conventional type having eighty vertical columns each with 12 perforation positions are fed from a supply hopper (not shown) with the 9's positions first and are advanced by feed rollers 2 past a row of sensing brushes 3, one of which is provided for each card column. Each of the brushes 3 concurrently senses the digit representing perforations in the card columns by making contact with a conductive roller element 4 through the perforations. The roller 4 is held at ground potential by connection through a circuit including a lead 5 and a brush 6 which is maintained in contact with the roller and, as a perforation is sensed in a particular column of the card, the associated reading brush 3 contacts the roller 4 to complete a circuit to ground. As the record card 1 is fed past the brushes 3, the relative times that the sensing circuit is completed indicates the value assigned to the perforation positions.

Each of the 80 brushes 3 provided for a standard card is connected individually through a coil 7 to a line 8 in which a condenser 9 and series resistor 10 is coupled, with the eighty lines 8 connected at the junction of elements 7 and 9 to a terminal maintained at +175 volts potential through further individual resistors 11. Only the first and last pairs of brushes and associated circuits are illustrated to avoid complicating the drawings. The condensers 9 are normally charged to substantially the voltage of this source until a perforation is sensed in a record card column, at which time they discharge through the choke 7 and brushes 3 and 6, providing a differentially timed electrical impulse to the lines 8. At least the interval of time between the passage of successive cards or between rows of a single card is available for recharging the condensers 9 so that the 175 volt source of potential (not shown) may be of low power capacity with consequent economic advantage.

The above described sensing operation converts the data recorded by perforations into differentially timed electrical signals indicative of the numerical value assigned to the perforation position and the information thus converted into electrical impulses is then stored in a two dimensional magnetic core storage array.

The leads 8 are connected to corresponding ones of 80 column conductors 12 of an array indicated generally as element 13. The conductors 12 are given subscripts corresponding with the associated column of the matrix.

The magnetic cores are arranged as a two dimensional array having eighty vertical columns each comprising twelve annular bistable cores 14, with the conductors 12 forming a set of windings linking each of the cores in a corresponding column. Twelve row conductors 15 are likewise provided and form windings linking each core of the 80 columns representative of a similar card perforation position or differential value. Each of the windings 15 are connected at one end to a common grounded bus 16 and at their other ends to a set of leads 17 coupled with individual corresponding contacts 18 of a twelve point emitter 19. The common terminal 21 of the emitter is connected through a resistor 21*a* and a cam operated contact 22 to a positive source of potential of +50 volts, and a contact wiper 23 is caused to operate in synchronism with the card feed apparatus so that pulses are supplied successively through leads 17 to the leads 15 at a digit level corresponding with the digit level of the record card being concurrently sensed at the brushes 3.

Figures 2, 3:
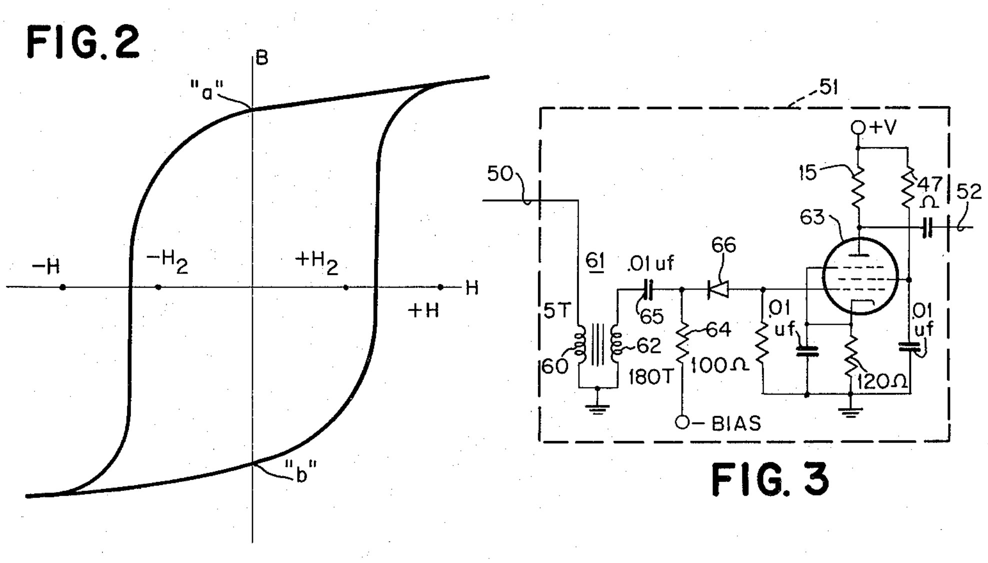
FIGURE 2 illustrates the hysteresis characteristic for a typical magnetic storage core.
FIGURE 3 illustrates the pulse transformer-amplifier circuit shown in block form in FIG. 1 in detail.

The magnetic cores 14 forming the individual storage elements of the array are so-called memory cores which exhibit a hysteresis characteristic such as that indicated in FIGURE 2. Such cores are readily adapted for use as binary storage elements as they exhibit a high degree of residual magnetism and have a low coercive force. For such purposes one state of magnetic remanence, for example point "*a*," is taken to represent a binary one and the opposite remanence state, point "*b*," then represents a binary zero. As shown in FIGURE 2, with a force of H magnitude applied, greater than the coercive force, and of proper direction, the hysteresis loop is traversed and the core retains the magnetic polarity toward which it is driven upon relaxation of the applied force. A force less than the coercive force, however, produces only a negligible flux change depending upon the squareness of the hysteresis characteristic, and the polarity of the core remains unchanged. The card reading circuit, including lines 12, is adapted to provide a differentially timed current pulse providing a magnetomotive force of $H/2$ magnitude, less than the coercive force, to each core of the associated array column, while the emitter circuit is likewise designed to successively provide a magnetomotive force of $H/2$ magnitude, less than the coercive force, to each of the cores at similar digit levels in the array. Applied individually, no resultant change in the polarization takes place; however, when applied simultaneously a force of H is provided in the core located at the intersection of the pulsed lines 12 and 15 and this core is caused to change states if initially in an opposite state and the combined forces are of proper direction so as to be additive in effect.

The record card sensing apparatus described analyzes the card columns so that the information contained in the eighty columns is presented to the array on a parallel basis with the data stored in successive cards spaced apart in time, whereas, in accordance with the present example, a utilization device may be adapted to accept information only as a series of time spaced representations.

In order to convert the information transferred to the magnetic core array into serial form, the eighty columns of cores are interrogated serially by means of a core thyratron ring circuit generally designated as component 25. This ring circuit comprises a chain of cascade coupled pulse producing stages each including a core 26 of the type having a somewhat rectangular hysteresis loop (FIG. 2) and a thyratron tube 27. Each core 26 is provided with three windings including an input coil 28 connected in series with the associated thyratron 27 through a pulse shaping inductance 29, an output coil 30 connected at one end to a negative voltage bias source of −20 volts and at the other end through a resister 32 to the control grid of the next succeeding adjacent thyratron stage, and a read out winding 34 connected in series with a similar read out winding of each other stage. The series connected windings 34 form a circuit connecting a positive 270 volt line 35 with the plate of a pulse driver tube 36. The supply line 35 is also connected to the plate of each thyratron 27 through a 90K ohm recharging resistor 37 and the plate terminal is also coupled to ground through a capacitor 38 and a limting resistor 39. The second grid of each thyratron 27 is connected to its cathode electrode through a protective 10K ohm resistor 40.

Eighty stages are provided, one for each column of the storage array 13, with the windings 28 of each stage connected to a corresponding column winding 12 and the opposite terminals of the windings 12 connected to a common grounded lead 41. A preliminary stage is coupled to the stage associated with column 1 and is provided with a cam contact 42 operated by the card sensing machine.

Each of the cores 26 is initially set at a first remanence state, as for example point "*b*" on the hysteresis loop illustrated in FIG. 2, and subsequent closure of the switch 42 on completion of a card sensing operation, pulses the winding 28 of the core 26 of the preliminary stage causing it to reverse its remanence state so as to attain point "*a*" on the loop. When the driver tube 36 is rendered conductive, as will be described hereafter, a pulse is applied to each of the series connected read windings 34 and is of such polarity as to apply a large negative M.M.F. to each core 27. With the exception of the first core, each stands at point "*b*" on its hysteresis loop and remains relatively unaffected, however, the first core changes state returning from point "*a*" to point "*b*" and an output voltage pulse is induced in the coil 30 of this core as the magnetic field collapses and builds up in the other direction. This induced pulse overcomes the −20 volt bias on the grid of the preliminary stage thyratron 27, as applied thereon through the winding 30, and this tube now fires with the associated condenser 38 discharging through the tube, the coil 29 and the winding 28, causing the core 26 of the column 1 ring stage to reverse remanence state or go from point "*b*" to point "*a*." After the aforementioned condenser 28 is discharged, the tube 27 is extinguished as the plate resistor 37 is sufficiently large to prevent continued conduction. The first ring stage is now primed and each succeeding pulse delivered by the driver tube 36 causes a successive firing of the thyratrons 27 in a progressive manner so that the column windings 12 are pulses in turn and the eighty columns of cores are read out in succession.

As each of the column windings 12 are pulsed from the thyratron ring circuit 25, sufficient current is passed to alone provide a magnetomotive force equal to or greater than −H magnitude to each core 14 of the associated column in the memory array 13 and causes those cores to reverse remanence state if representing a digit read from the record card 1 at that position or if standing at point "*a*" on their hysteresis loops.

In reversing remanence states from "*a*" to "*b*," the memory core 14 induces a voltage in the coils 15 which now function as secondary windings and this induced pulse is applied through a lead 50, to a pulse transformer circuit 51, as will be later described, provided for each digit level of the matrix. The amplified output is then applied, via corresponding leads 52, to information exit channels or to individual triggers 55 which store the representative indication until read out for further use. Twelve triggers 55 are provided, one for each line 12, representative of a perforation position on the record card. The triggers 55 may be of any conventional type known to the art, as for example, a vacuum tube trigger, and are shown in block form as they form no part of the present invention per se.

The pulse transformer circuits 51 shown in FIG. 1 in block form are illustrated in detail in FIG. 3 where the lead 50 coupled with the windings 15 of the memory array is seen to be connected to the primary winding 60 of a pulse transformer 61. The secondary winding 62 is connected to the grid of an amplifier tube 63 through a threshold circuit including a resistor 64 connected to a negative bias source (not shown), a blocking condenser 65 and diode 66. As the tube 63 is cut off by an amplified negative pulse whose magnitude exceeds the minimum threshold value, the plate potential increases for the interval and a positive voltage pulse is produced on the output lead 52 connected therewith and is applied to the input of the associated trigger device or directly to exit channels coupled to a utilization device input. The triggers 55 may be of any conventional type and are set at a first stable condition initially or before the first column of the matrix of cores 13 is interrogated by the ring circuit 25 as will be described, and the output pulse appearing on leads 52 and applied thereto causes those triggers to change to their second stable condition. Trigger output voltages, or their transitions, may be utilized in any conventional fashion and it is not intended that the invention be limited to the specific mode of trigger response here described.

In the utilization device, apparatus is provided for producing a pair of timed electrical impulses having a repetition rate corresponding with the desired rate of delivery of information. Such apparatus may be in the form of a crystal controlled pulse generator, mechanically operated contacts driven in synchronism with the utilization device or other electronic or electromechanical means as desired having correlation with the delivery rate to be maintained. Such a pulse producing component is illustrated in block diagram form as element 75 having a pair of output conductors 76 and 77 to which timed spaced pulses "A" and "B," respectively, are delivered as shown graphically above the output lines. These "A" pulses are employed to control the rate of delivery of the stored information to the utilization device, and in performing this function control the operation of the thyratron ring circuit 25. The "B" pulses control the reset of the twelve triggers 55. Each "A" pulse causes a column of the storage matrix to be pulsed and read out while each following "B" pulse causes the storage triggers 55 to reset to their first stable states. The conductor 76 is connected to pulse a single shot multivibrator 78 and the output of the latter pulses the control grid of the aforementioned ring driver tube 36 through a cathode follower 79. Elements 78 and 79 are shown in block form as they have attained a conventional status in the art and any one of many well-known circuit arrangements may be employed with the multivibrator designed to produce an output pulse of approximately one half microsecond duration.

The lead 77 is connected to the remaining input terminal of each of the triggers 55 and causes those triggers standing at a condition representing stored information at that digit level to revert to an initial state, producing an output pulse on associated terminals 70 at "B" pulse time. This output signal or an output pulse that occurs at the "A" time when the trigger turns on; or D.C. output levels may be used as mentioned heretofore.

The operation of the card feed and sensing device may occur as a continuous process; however, as each successive card is delivered from a card hopper (not shown) to the brush sensing station, some interval is allowed between the trailing edge of each card and the leading edge of the successive card. As the sensing of each card and entry of the information in the magnetic core array 13 is completed, the cam operated switch 42 is closed priming the first preliminary stage of the ring 25 so that the aforementioned "A" pulses are effective to step the ring and cause a column by column read out. The interval between the sensing of successive records cards is therefore seen to be employed for the delivery of stored data from the buffer device and the usually slower card feeding and sensing device is operated at its full speed.

The apparatus thus far illustrated and described transforms information available in paralle form to serial form and at a different pulse delivery rate. Conversion may also be accomplished from one coded form of the information to another by means of a conventional diode matrix code converter, or at the same time as the time-space conversions described take place, by simple alteration of the emitter connections. A twelve digit Hollerith code is employed in the standard IBM record cards and provides for both numerical and alphabetical coding of information wherein a single perforation or impulse in the 0 through 9 index positions represents a like numerical value whereas combinational perforations including the 11 and 12 positions represent alphabetical or standard type symbols. In accordance with a modified binary code the decimal digits 1, 2, 4, and 8 are represented by single binary digits while a decimal 3 is represented by binary digits in the 1 and 2 positions, a decimal 5 by binary digits in the 1 and 4 positions, a decimal 6 by binary digits in the 4 and 2 positions, and a decimal 7 by binary digits in the 1, 2 and 4 positions and a decimal 9 by binary digits in the 1 and 8 positions. To develop a modified binary code output within the buffer device illustrated, the 3, 5, 6, 7 and 9 rows of cores in the matrix 13 may be eliminated and the emitter contact 18 and lead 17 for the 3 position connected to the windings 15 of the 1 and 2 positions, that for the 5 position connected to windings 15 of the 1 and 4 positions, etc., in a manner similar to that described in the copending application for Magnetic Core Converter, Serial Number 358,101, filed May 28, 1953, and now issued as Patent No. 2,774,-429, on behalf of Edward J. Rabenda.

The conversion arrangement illustrated provides for transforming information available in parallel form to serial form, however, a transformation in the reverse sense may be accomplished in a like manner by applying serial information to the leads 17 in synchronism with the pulsing of the leads 12 by an eighty point emitter or other timing distributor. Reading the information in parallel may then be accomplished at a desired rate through pulsing of a twelve stage thyratron ring cricuit coupled to the twelve leads 15. Eighty triggers 55 or exit channels would then be provided and connected individually to the leads 12.

Figure 4:
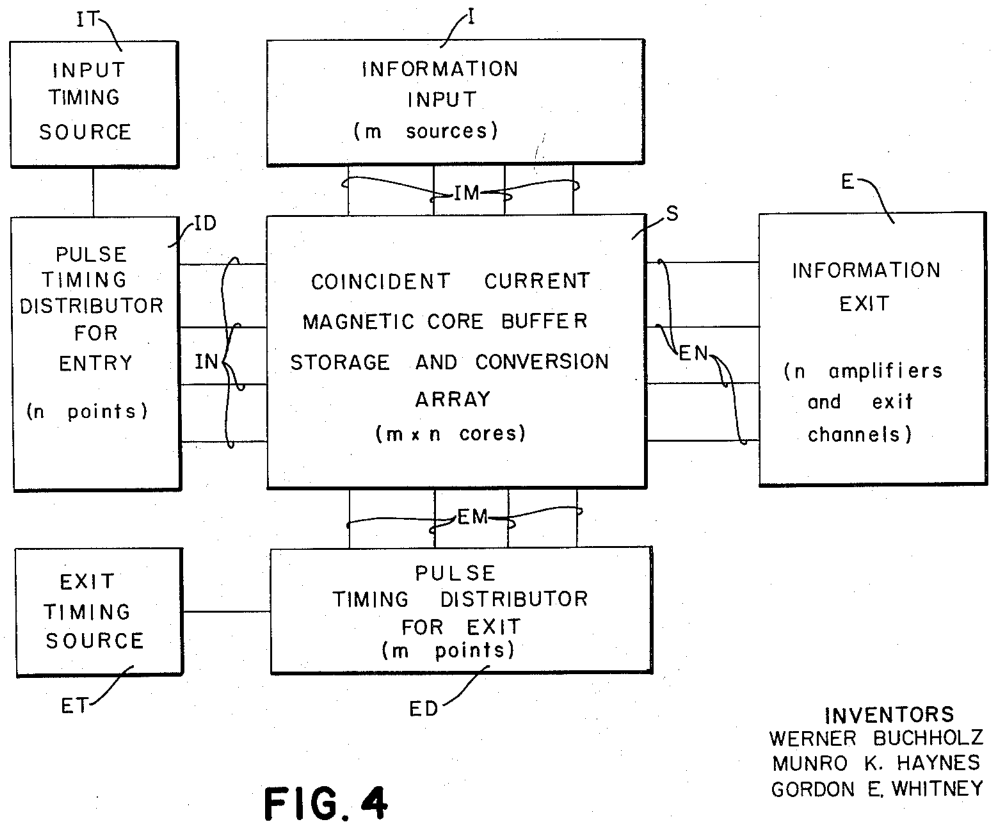
FIGURE 4 is a block diagram of the magnetic core buffer and conversion system employed in explaining the broad scope of the invention.

The flexibility of the system described may be more clearly appreciated with the several components illustrated in block diagram form. Referring now to FIG. 4, the buffer storage and conversion system comprises a component S representative of a matrix of magnetic cores arranged as a two dimensional array having M cores along one and N cores along the other coordinate dimension. The notations M and N have been selected to indicate that the number of cores may be arbitrarily chosen and that the array need not be symmetrical. The input components comprise the block I representing M input signal sources and the block ID representing an N point pulse distributor operated at a rate determined by an input timing source IT. The exit components comprise the block E representing N information exit channels and the block ED representing an M point pulse distributor operated at a rate determined by an exit timing source ET.

As previously mentioned, information representing signals may be available in parallel form when serial information is required or conversely information may be available in serial form while parallel information is required with, in each instance, a different rate of information delivery also necessary to couple systems of different pulse input and output speeds.

As described specifically in connection with FIG. 1, with parallel information available the card sensing unit delivers information signals on the M input channels 8 with the signals on each channel differentially timed to represent one of N possible values. In FIG. 4, the element I corresponds with the card sensing device with the M input channels 8 being the leads IM. The input timing cam 22 corresponds with the pulse source IT and the emitter 19 corresponds with the entry pulse distributor ID. Serial output is obtained by pulsing the M windings of the array in sequence through leads EM by operation of the exit timing source ET and exit pulse timing distributor ED, with an output developed on one of the EN exit channels and directed to unit E in serial sequence. The exit timing source ET in FIG. 4 corresponds to the pulse generator 75 and tube 36 in FIG. 1, with the element ED being the ring circuit 25.

A transformation in the reverse sense, that is with serial information available and parallel information desired for use, the input component I applies a series of pulses spaced apart in time on one of the M input leads IM as representative of values for each of N digits, and the entry timing distributor ID pulses the IN entry coordinate leads in sequence in accordance with digit delivery determined by IT. The parallel output is then obtained by operation of the component ED in pulsing the EM channels in sequence with a current equal to or greater than that producing —H magnetomotive force and developing N differentially timed impulses representing N items of information appearing at component E through leads EN, the value representing time differential of the impulse on each channel being determined by the timing source ET.

It is thus seen that the converter buffer system is capable of operating in a manner to convert both the form, rate and code of information representing electrical signals and, while specific structure and values of certain elements are shown and described in connection with the foregoing explanation of the system, it is to be understood that the invention is not to be limited to such specific values and that other known equivalent elements and componnets may be employed without exercise of invention.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A circuit comprising a plurality of consecutively arranged magnetic cores, an input, output and actuating winding on each of said cores, a discharge device for each of said cores connected to the input winding thereof, circuit connections between the output winding on one of said cores and the grid of the discharge device associated with the next adjacent consecutive one of said cores and adapted to activate the discharge device only when the flux direction within the core of said output winding changes from a predetermined direction to the other direction in response to an actuating signal applied to said actuating windings, actuation of said discharge device causing current flow in said input winding and establishing a predetermined flux direction within the core of said input windings, and a load circuit connected in series with each of said input windings and said discharge devices.

2. A circuit according to claim 1 including a capacitor connected to the anode-cathode circuit of said thyratron discharge device and adapted to discharge therethrough in a path including said input winding and said load circuit.

3. In a pulse producing system, a plurality of successively arranged magnetic elements each having a substantially rectangular hysteresis characteristic; an input, output, and an actuating winding on each of said elements; a thyratron discharge device for each of said elements and connected in series with the input winding thereof; circuit means connecting said output windings to the control grid of the thyratron associated with the next succeeding magnetic element and adapted to render the thyratron conductive only when the flux direction within the magnetic element of said output winding changes from a predetermined direction to the other direction in response to an actuating signal applied to the actuating winding; conduction through said thyratron causing current flow in said first winding associated therewith and establishing a predetermined flux direction within the element of said input winding.

4. In a pulse producing system, a plurality of successively arranged magnetic elements each having a substantially rectangular hysteresis characteristic; an input, an output, and an actuating winding on each of said magnetic elements, a thyratron discharge device for each of said elements and connected in series with the input winding thereof through an impedance device; circuit means coupling said output winding to a bias source and to the control grid of the thyratron associated with the next succeeding magnetic element and adapted to render the thyratron conductive only when the flux direction within the magnetic element of said output winding changes from a predetermined direction to the other direction in response to an actuating signal applied to said actuating winding; means for simultaneously applying electrical impulses to the actuating windings of each of said magnetic elements; a load device, a source of potential; means coupling said load device in series with said input winding and said thyratron in series with said source of potential through a resistor; and capacitor means connected to the anode of said thyratron.

5. An open chain or closed ring counter comprising a plurality of bistable magnetic elements each having a plurality of energizing windings cooperatively associated therewith, an electron discharge device associated with each said elements, an actuating circuit comprising a series connection including a first winding comprising an actuating winding on each said element, said elements being normally in a first magnetic state, means for driving a given one of said elements to a second magnetic state, means responsive to an electrical impulse in said series circuit for driving said element in said second magnetic state to its first normal magnetic state, a second of said windings comprising an output winding on each said element being connected to an output circuit for each said element, said output circuit including the control grid of the electron discharge device, associated with the next in order one of said elements, a third winding comprising an input winding on the next in order one of said elements and connected in the anode-cathode circuit of said discharge device, said output winding and said discharge device being responsive to a change in state of said magnetic element from a second magnetic state to said normal first magnetic state, whereby said next in order one of said elements is dirven by its input winding from its said normal first magnetic state to its said second magnetic state, and a load circuit series connected with said input windings.

References Cited in the file of this patent

UNITED STATES PATENTS

| | | |
|---|---|---|
| 2,591,406 | Carter | Apr. 1, 1952 |
| 2,638,542 | Fleming | May 12, 1953 |
| 2,772,357 | An Wang | Nov. 27, 1956 |
| 2,819,395 | Jones | Jan. 7, 1958 |
| 2,846,669 | McMillan | Aug. 5, 1958 |
| 2,876,438 | Jones | Mar. 3, 1959 |

OTHER REFERENCES

"A Magnetic Scaling Circuit," Journal of Applied Physics, vol. 22, January 1951, pp. 107–108.